US012683867B2

(12) United States Patent　　(10) Patent No.:　US 12,683,867 B2
Bragalone　　　　　　　　　　　　(45) Date of Patent:　　　Jul. 14, 2026

(54) AUTOMATED CLOUD INFRASTRUCTURE TOPOLOGY SIMULATION AND IMPLEMENTATION

(71) Applicant: Capital One Services, LLC, McLean, VA (US)

(72) Inventor: Michael Bragalone, Jersey City, NJ (US)

(73) Assignee: Capital One Services, LLC, McLean, VA (US)

( * ) Notice: Subject to any disclaimer, the term of this patent is extended or adjusted under 35 U.S.C. 154(b) by 34 days.

(21) Appl. No.: 18/771,324

(22) Filed: Jul. 12, 2024

(65) Prior Publication Data

US 2026/0019338 A1　　Jan. 15, 2026

(51) Int. Cl.
　　*H04L 41/12*　　　(2022.01)
　　*H04L 41/14*　　　(2022.01)
　　*H04L 67/10*　　　(2022.01)
(52) U.S. Cl.
　　CPC ............ *H04L 41/12* (2013.01); *H04L 41/145* (2013.01); *H04L 67/10* (2013.01)
(58) Field of Classification Search
　　CPC .............................. H04L 41/12; H04L 41/145
　　See application file for complete search history.

(56) References Cited

U.S. PATENT DOCUMENTS

| | | | | |
|---|---|---|---|---|
| 2013/0297769 A1* | 11/2013 | Chang | ................... | G06F 9/5077 709/224 |
| 2017/0230266 A1* | 8/2017 | Smola | ................. | H04L 43/0876 |
| 2025/0278326 A1* | 9/2025 | Peng | ..................... | G06F 11/079 |

FOREIGN PATENT DOCUMENTS

EP　　　　3770760 A1 *　1/2021　............ G06F 9/5011

OTHER PUBLICATIONS

Online Network Diagram Tool, smartdraw, date of first publication unknown but, prior to May 8, 2024, 11 pages.
Nov. 30, 2022—Visualizing Network Topology Using Netdisco, vkhitrin.com, Technology and Ramblings, 6 pages.
Network Topology Mapper, Solarwinds, date of first publication unknown but, prior to May 8, 2024, 4 pages.

(Continued)

*Primary Examiner* — Hua Fan
(74) *Attorney, Agent, or Firm* — Banner & Witcoff, Ltd.

(57)　　　　　　　　ABSTRACT

Systems, methods, and apparatuses are described for automatically generating and simulating cloud infrastructure topologies. A computing device may provide a user interface displaying a cloud infrastructure topology and may receive user input indicating modifications to that topology. The computing device may generate simulation data by determining estimated resources used by each element of the modified version of the cloud infrastructure topology during simulation of the modified version of the cloud infrastructure topology. Such simulation might be determined by simulating events, probabilistically, and/or through use of a trained machine learning model. The computing device may then identify recommended changes to the modified version of the cloud infrastructure topology based on that simulation data and cause output of those recommended changes. Such recommendations might relate to moving various elements to different cloud service providers to, for example, improve stability and/or lower costs.

20 Claims, 8 Drawing Sheets

(56)           References Cited

OTHER PUBLICATIONS

10 Cloud Cost Calculators for Estimating Your Cloud Spend, Spot, by NetApp, date of first publication unknown but, prior to May 8, 2024, 18 pages.

The best calculator, Holori, date of first publication unknown but, prior to May 8, 2024, 6 pages.

Strengthening your FinOps practice with CloudOps, Kion, date of first publication unknown but, prior to May 8, 2024, 3 pages.

Optimize Kubernetes Cast Without Months of Onboarding, cast, date of first publication unknown but, prior to May 8, 2024, 9 pages.

* cited by examiner

AUTOMATED CLOUD INFRASTRUCTURE TOPOLOGY SIMULATION AND IMPLEMENTATION

FIELD OF USE

Aspects of the disclosure relate generally to simulating and implementing changes to cloud networks. More particularly, aspects described herein describe a process for simulating the behavior of cloud networks with various topologies and identifying changes to those networks.

BACKGROUND

When implementing various applications/services in a cloud environment, administrators might plan out a cloud network that comprises various elements (e.g., physical or logical servers, services, and the like) that interconnect in various ways. For example, an administrator of a social networking application might want to implement a cloud architecture comprising various databases (e.g., a user database, a photos database) connected to various servers (e.g., web servers, authentication servers). To design such architectures, an administrator might use design software that allows that administrator to (for example) drag-and-drop various elements into a representation of the network (often referred to as a network topology or cloud infrastructure topology) to visually understand the network structure. This approach is, in many ways, similar to how network administrators of local networks (e.g., an enterprise network) might design and understand those networks.

The increasing complexity of cloud networks has made conventional approaches to network design prohibitively difficult. While administrators might be able to design networks in rudimentary ways (e.g., connecting various servers and databases together), it may be prohibitively difficult for those same administrators to implement and/or modify such designs in view of the benefits and downsides of different cloud service providers, security requirements, cost considerations, reliability, Service-Level Agreements (SLAs), and the like. For example, an administrator might inadvertently configure various elements of a cloud service provider to perform efficiently without realizing that the element(s) used are historically unreliable or costly. As another example, an administrator might, with performance in mind, over-design a cloud system in a manner which is extremely costly on the cloud service provider that they use, but would be reasonably-priced if implemented on another cloud service provider.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to automatically generating and simulating cloud infrastructure topologies. A computing device may provide a user interface that allows users to view, edit, and otherwise simulate a cloud infrastructure topology. For example, such a user interface may comprise various servers, databases, connections, and the like, and a user might be able to drag-and-drop and otherwise edit such elements to reconfigure the cloud infrastructure topology as desired. The computing device may receive an indication of a change of a first element of the cloud infrastructure topology from a first cloud service provider to a second cloud service provider. Upon such user input, the computing device may be configured to simulate the effects of any modification(s) to the cloud infrastructure topology by measuring performance parameters of individual elements/connections of the cloud infrastructure topology. Such simulation might generate simulation data, such as data indicating various resources used by each element of a modified version of the cloud infrastructure topology. For instance, a modification adding a redundant server might be simulated, and corresponding simulation data might indicate that the addition of the redundant server improves network stability but adds significant financial cost. This simulation might be performed probabilistically, through the use of machine learning techniques, and/or by simulating various different events. The computing device might then identify recommended changes (e.g., to not add the redundant server due to cost concerns) and output those recommended changes. To identify these changes, the computing device may compare the simulation data to one or more user-specified infrastructure constraints. Such recommended changes might be automatically implemented along with any changes requested by the user. In this manner, the computing device might help administrators implement changes to cloud infrastructure topologies, but might do so in a manner that ensures that potential risks (e.g., cybersecurity risk, uptime risk, financial risk) are considered through the benefit of simulation.

More particularly, a computing device may provide a user interface configured to display a cloud infrastructure topology. The computing device may then receive, from a user and via the user interface, one or more user inputs that comprise one or more modifications to one or more elements of the cloud infrastructure topology. The computing device may determine, based on the one or more user inputs, a modified version of the cloud infrastructure topology. Then, the computing device may, in response to the user input, generate simulation data by determining estimated resources used by each element of the modified version of the cloud infrastructure topology during simulation of the modified version of the cloud infrastructure topology. The computing device may then identify, based on the simulation data, one or more recommended changes to the modified version of the cloud infrastructure topology and cause output, in the user interface, of the one or more recommended changes to the modified version of the cloud infrastructure topology. For instance, the computing device may output a recommendation to implement the at least one element of the modified version of the cloud infrastructure topology on a different cloud service provider. As part of such output, a computing device may process the one or more recommended changes (and/or the modified version of the cloud infrastructure topology) using natural language processing algorithms and/or machine learning models so as to generate a human-friendly version of such output. The computing device may additionally and/or alternatively modify the display of the cloud infrastructure topology based on the one or more modifications to the cloud infrastructure topology and/or the recommended changes to the modified version of the cloud infrastructure topology. The computing device may further cause a cloud service provider to implement at least a portion of the one or more modifications to the one or more elements of the cloud infrastructure topology and/or at least a portion of the one or more recommended changes to the modified version of the cloud infrastructure topology.

The simulation performed by the computing device may be performed in a variety of ways. For example, the simulation might involve use of a trained machine learning model. The computing device may generate a trained machine learning model by training, using training data comprising a history of performance of a plurality of different networks, a machine learning model implemented using an artificial neural network, wherein training the machine learning model comprises modifying one or more weights of the artificial neural network based on the training data. Then, the computing device may provide, to a trained machine learning model, input data indicating the modified version of the cloud infrastructure topology and receive, as output from the trained machine learning model, output indicating the estimated resources used by each element of the modified version of the cloud infrastructure topology. Additionally and/or alternatively, such simulation may be performed by simulating events on the modified network. For example, the computing device may simulate a plurality of different possible events occurring in the modified version of the cloud infrastructure topology and may determine, for each of the plurality of different possible events, the estimated resources used by each element of the modified version of the cloud infrastructure topology.

The computing device may generate a variety of different recommended changes based on different possible optimization goals. Such optimization goals may include, for example, cost optimization, speed optimization, uptime optimization, or the like. For instance, the computing device may generate a first recommended change by determining, based on the simulation data, a cost-saving change to the modified version of the cloud infrastructure topology and/or may generate a second recommended change by determining, based on the simulation data, a speed-improving change to the modified version of the cloud infrastructure topology.

The computing device may be configured to automatically implement the changes requested by a user and/or the recommended changes determined based on the simulation data. As indicated above, this may include causing one or more cloud service providers to implement at least a portion of the one or more modifications to the one or more elements of the cloud infrastructure topology and/or at least a portion of the one or more recommended changes to the modified version of the cloud infrastructure topology. For example, the computing device may, as part of causing output of the one or more recommended changes, transmit, to a cloud service provider, instructions configured to cause the cloud service provider to implement the one or more modifications to the cloud infrastructure topology and/or the recommended changes to the modified version of the cloud infrastructure topology.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
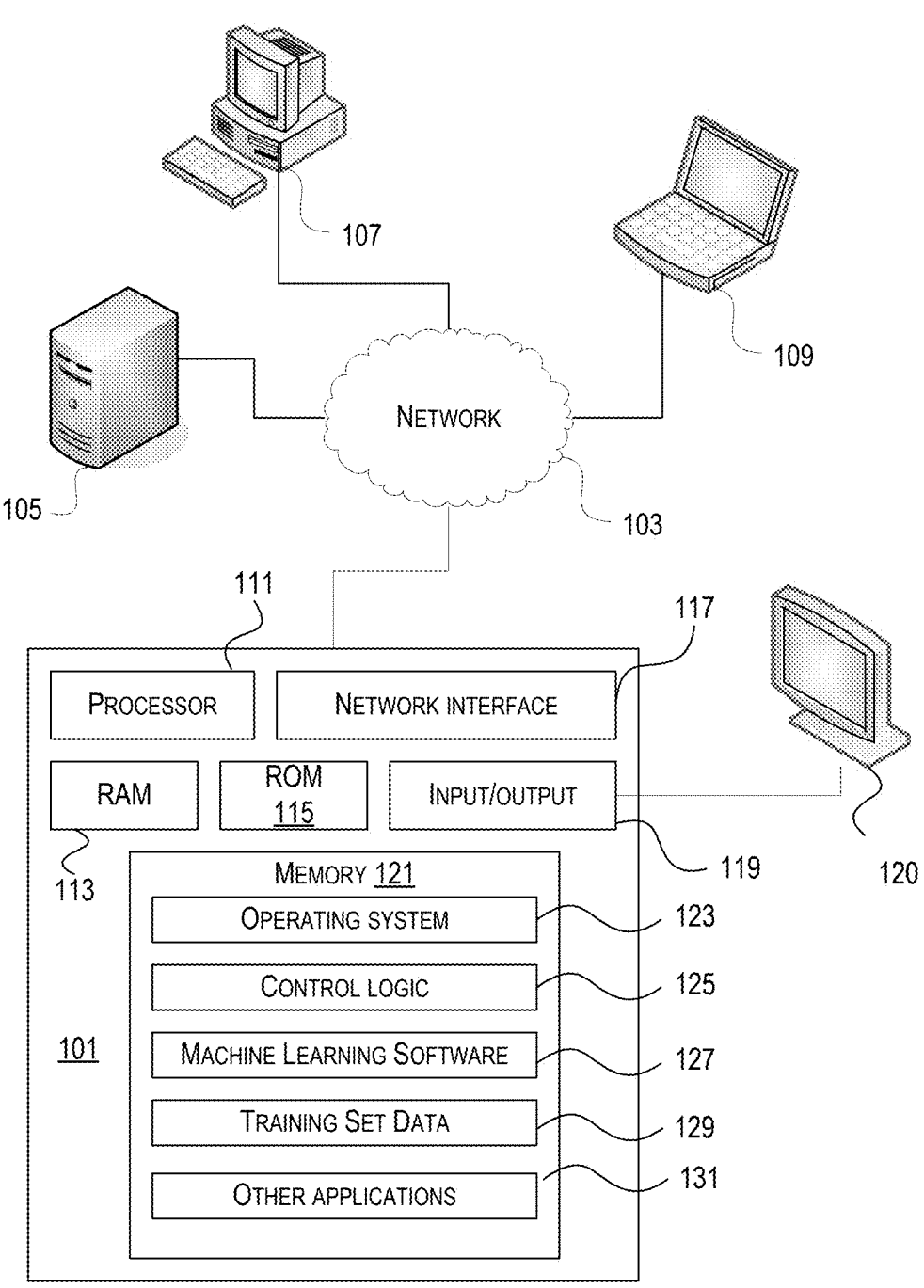
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, the increasing complexity of cloud networks in terms of size and number of different cloud service providers has made it primitively difficult for users to accurately predict the effect of changes to cloud network topologies. For instance, it may be extremely difficult to identify the effect of the removal of a server in terms of considerations such as application performance, uptime, cost, and the like, particularly in circumstances where a particular application implemented via that server is also implemented by a variety of other servers across the world. As another example, it may be difficult to determine the security implications of certain changes to the network (e.g., use of certain servers, cloud network providers, messaging protocols) given the voluminous size of a network used to provide certain applications. In turn, it is frequently the case that administrators' changes to a cloud network topology can have negative effects on that network, even where unintended. For example, a change that improves application performance via the addition of a redundant server can unexpectedly add significant costs and can, in some instances, actually harm uptime/performance.

To remedy these and other issues, aspects described herein relate to generating and simulating cloud infrastructure topologies in a way that allows users to make changes to cloud infrastructure topologies more intelligently. In this system, a user can provide, through an interface, input that indicates changes to (e.g., edits to, creation of) a cloud network topology. The computing device might then simulate that cloud infrastructure topology and collect data that indicates, for example, resources used by each element of the topology. Such resources might include bandwidth, uptime, lag and/or latency, cost, or the like. The computing device might then, based on that simulation data, identify and output recommended changes. For example, if a modification requested by the user is identified as introducing undesirable risk to the system (e.g., from a cybersecurity and/or uptime perspective), the computing device might output recommendations to minimize that risk, such as a recommendation to implement a change by moving certain elements of the cloud network topology on a different cloud service provider. As another example, if a modification requested by a user seems to incur additional cost, then various cost-saving approaches might be recommended. The user-requested modifications and/or the recommended changes might then be implemented automatically. For example, user-requested modifications might be implemented, a first portion of the recommended changes relating to cybersecurity might be automatically implemented (e.g., given the importance of cybersecurity), and a user might be provided the option to implement a second portion of the recommended changes that relate to network stability (e.g., because the changes might be more nuanced or less immediately time-critical). Another benefit of the aspects described herein, as will be described further below, is the ability of the present disclosure to process output to generate human-friendly output relating to cloud infrastructure topologies. Through use of (for instance) machine learning techniques and natural language processing techniques, the present disclosure can provide information about recommended changes (e.g., provide a user interface providing the option to implement various recommended changes) in a manner that allows users to fully understand the recommended changes, rather than in a manner that is so obtuse and/or technically specific as to be confusing.

Aspects described herein improve the functioning of computers by using simulation to measure the actual effect of changes to cloud networks. As indicated above, the fast-moving and complex nature of cloud networks means that even small changes can have significant long-reaching effects on the network. As such, when a user purports to make changes to a cloud infrastructure topology, it can be basically impossible for them to predict the results of such changes until those changes are implemented. The present disclosure uses computer simulation (e.g., through machine learning and/or emulation of various events on simulated networks) to determine whether additional changes might be needed to a cloud infrastructure topology based on requested changes to that same cloud infrastructure topology. In turn, the present disclosure configures a computing device to emulate and thereby predict the behavior of other computing devices (e.g., as part of a cloud network), which in turn allows for optimization of those other computing devices. One result of this process is that the present disclosure provides improvements to processing speed, lag, latency, application delivery, and the like. Moreover, the present disclosure is significantly more than a process than a human could perform because, as suggested by the fact that the system is configured to provide recommended changes in addition to user-input changes, humans are ill-equipped to fully understand the scope of changes, particularly as they are made to complex cloud topologies.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

FIG. 1 also shows that the computing device 101 may comprise a Hardware Security Module (HSM) 132 and/or a Quantum Random Number Generator (QRNG) 133. The HSM 132 may comprise any computing module (e.g., one or more computer chips, attached cards, or the like) which may be capable of managing secrets, performing encryption and/or decryption, and/or otherwise performing security- and/or authentication-related functions. The HSM 132 may comprise, for instance, one or more secure cryptoprocessor chips which are capable of performing cryptographic operations. The QRNG 133 may comprise any computing module (e.g., one or more computer chips, attached cards, or the like) capable of generating a random number. Such a random number might be generated using quantum methods which permit the random number to have a high degree of entropy.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
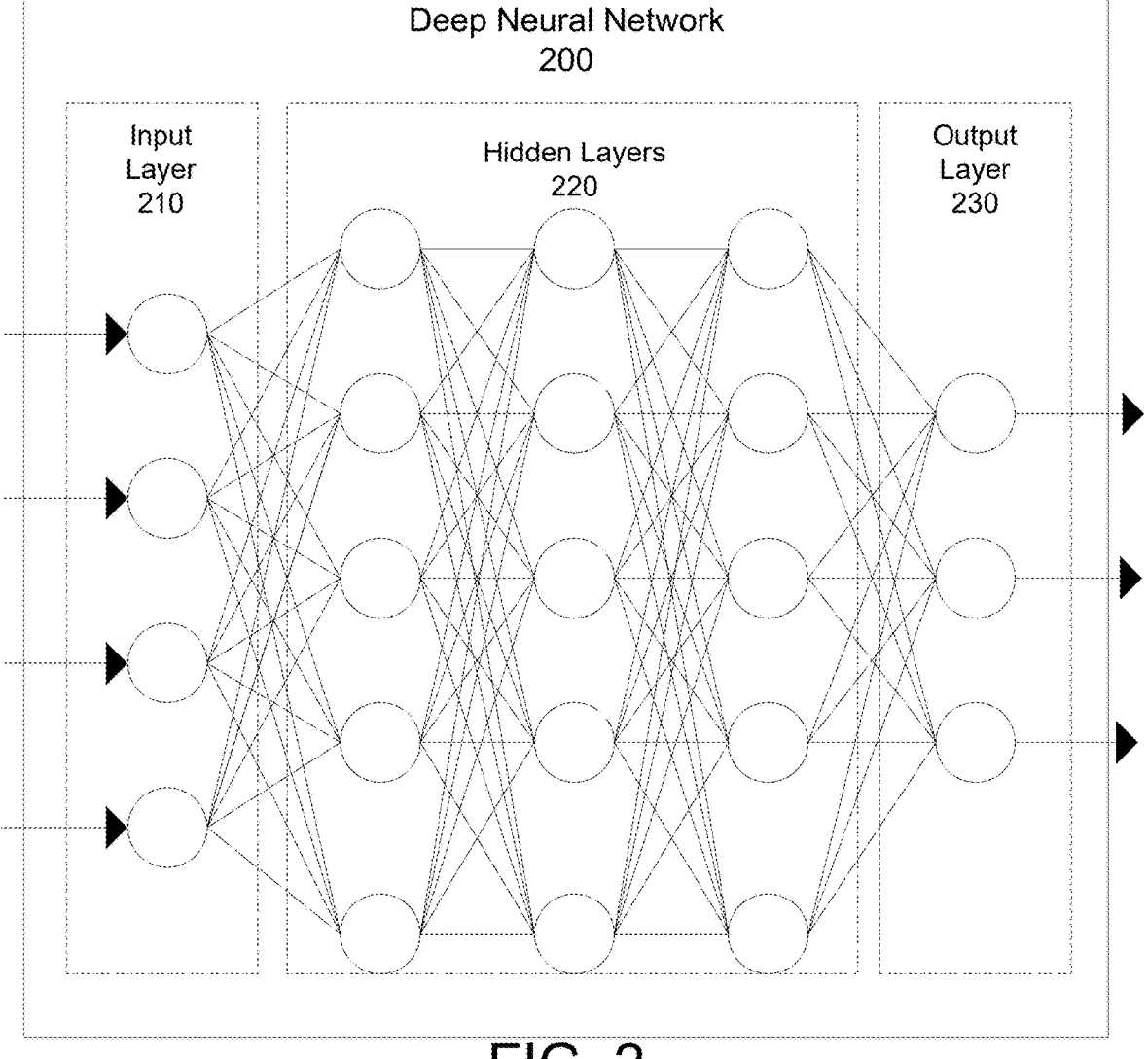
FIG. 2 depicts an example deep neural network architecture for a model according to one or more aspects of the disclosure

FIG. 2 illustrates an example of a deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network architecture 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
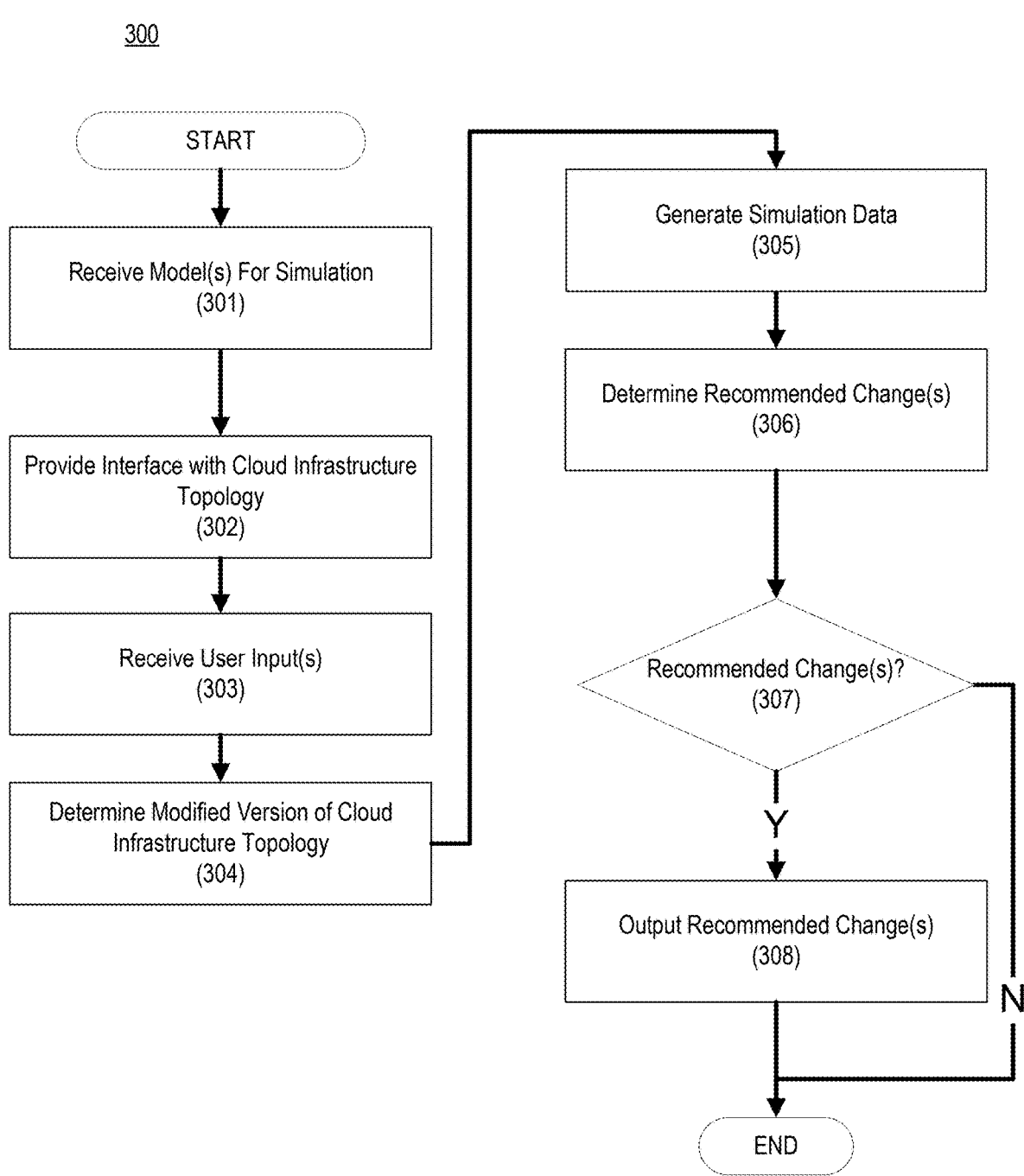
FIG. 3 depicts a method comprising steps for automatically generating and simulating cloud infrastructure topologies.

FIG. 3 depicts a method 300 comprising steps for automatically generating and simulating cloud infrastructure topologies which may be performed by a computing device, such as any one of the devices described with respect to FIG. 1 and/or FIG. 2. The steps shown in FIG. 3 are illustrative, and may be re-arranged, omitted, and/or modified as desired. A computing device may comprise one or more processors and memory storing instructions that, when executed by the one or more processors, cause the performance of one or more of the steps depicted in FIG. 3. One or more non-transitory computer-readable media may store instructions that, when executed, cause the performance of one or more of the steps depicted in FIG. 3.

In step 301, a computing device may receive one or more models for simulating cloud infrastructure topologies. The one or more models may comprise machine learning models, algorithms, rulesets, statistical models, or the like. In this manner, the computing device may receive data (e.g., algorithms, pre-trained machine learning models) which allow it to, when presented with a cloud infrastructure topology (or modifications/portions thereof), simulate the behavior of such a cloud infrastructure topology. Such models might be periodically updated (e.g., by an administrator, by further training of a machine learning model, or the like), such that the computing device's ability to predict the behavior of a cloud infrastructure topology may be improved over time.

As part of receiving the one or more models, the computing device may generate a trained machine learning model (e.g., as implemented via an artificial neural network, such as the one described above with respect to FIG. 2) based on historical network data. In addition to and/or in alternative to the programming of a custom algorithm, ruleset, or the like, the computing device may use historical data relating to the past performance of one or more cloud infrastructure topologies to train a machine learning model to predict the performance of input cloud infrastructure topologies. For example, the computing device may generate the trained machine learning model by training, using training data comprising a history of performance of a plurality of different networks, a machine learning model implemented using an artificial neural network. As part of this process, training the machine learning model may comprise modifying one or more weights of the artificial neural network based on the training data. Such past performance data may be collected by, for example, querying one or more cloud infrastructure providers for historical data relating to one or more cloud infrastructure topologies. Such data might indicate, for example, historical bandwidth usage, historical uptime (and/or downtime), actual costs incurred to run the one or more cloud infrastructure topologies, and the like.

The one or more models may comprise one or more rules, such as rules specifying bandwidth usage, costs, or the like. For example, the one or more models may comprise a rule indicating a specific currency amount for each gigabyte of data stored, transmitted, or the like. As another example, the one or more models may comprise a rule that indicates a cost of each additional redundant service, server, or the like. In this manner, known values (e.g., fixed costs or certain behavior, limitations on services based on their SLAs) may be taken into account via the one or more models.

The one or more models may indicate user-specified infrastructure constraints. Different services and/or applications provided by a cloud network might have different requirements in terms of performance (e.g., uptime, speed, reliability) and/or cost, such that user-specified infrastructure constraints might be used to inform the viability of various cloud infrastructure topologies. For instance, an organization may wish to spend no more than $500 a month on a particular service, such that any cloud infrastructure topology for that service may be limited to using elements (e.g., servers, services) and connections that are, in their totality, under that amount.

In step 302, the computing device may provide an interface comprising one or more cloud infrastructure topologies. This step may comprise, for instance, displaying a graphical representation of one or more cloud infrastructure topologies on a user interface, such as in an application window of software executing on a computing device such as a smartphone, desktop, laptop, or the like. For example, the computing device may provide (e.g., via a display device such as a computer screen) a user interface configured to display a cloud infrastructure topology. Various elements of the one or more cloud infrastructure topologies may be depicted, and one or more connections between those elements might also be depicted. For example, connections (logical or physical) between different elements (logical or physical) may be depicted as icons (e.g., an icon of a server, an icon of a database), with connections between those elements depicted as lines, arrows, or the like.

Though step 302 describes display of one or more cloud infrastructure topologies, the display need not comprise any particular elements or connections. For example, a user might desire to create a new cloud infrastructure topology, such that step 302 might, in effect, display an empty cloud infrastructure topology. The user might then (as will be described below) provide modifications to that empty cloud infrastructure topology by adding elements as desired.

As described herein, a cloud infrastructure topology may comprise any representation of a network comprising services, servers, databases, computing devices, or the like. Though referred to as a cloud infrastructure topology, various elements (e.g., servers, computing devices) of a cloud infrastructure topology may be local to a user, such as located in a nearby office building, on the same intranet, or the like. For example, a cloud infrastructure topology may comprise cloud resources (such as services provided by a cloud service provider) as well as local resources (e.g., user devices, a database local to an organization's offices, or the like).

In step 303, the computing device may receive one or more user inputs. These user inputs may indicate one or more modifications to one or more cloud infrastructure topologies. For example, the computing device may receive, from a user and via the user interface, one or more user inputs that comprise one or more modifications to one or more elements of the cloud infrastructure topology. The inputs may comprise dragging-and-dropping elements and/ or connections between elements in the user interface to modify the one or more cloud infrastructure topologies. The inputs may additionally and/or alternatively comprise adding and/or removing elements and/or connections of one or more cloud infrastructure topologies. As the nature of the user interface may vary (e.g., based on the nature of the computing device displaying the user interface), the particular nature of user input may vary. For example, a user might provide user input via textual commands typed in using a keyboard, using a touchscreen, using a mouse, or the like. In some cases, the one or more inputs may be provided via Extensible Markup Language (XML) input. For example, a user may provide XML data indicating a preferred configuration of a cloud infrastructure topology, which may be processed to identify differences between the preferred configuration and an existing configuration of the cloud infrastructure topology.

The one or more user inputs need not be limited to the addition/removal of elements/connections, but may additionally and/or alternatively comprise changing the operating parameters and/or other nature of individual elements and/or connections. For example, the one or more user inputs may comprise a change in the operating system of a particular server, the change in the cloud service provider used to execute a particular service, a change in storage architecture of a particular server, a change in size of a logical service (e.g., from "small" to "big"), a change in available bandwidth of an existing connection, the relocation of the same server to a new physical location (e.g., moving a server from one office to another), or the like.

In step 304, the computing device may determine a modified version of the cloud infrastructure topology. In this manner, the computing device may determine what one or more cloud infrastructure topologies may look like once modified in accordance with the user input received in step 303. For example, the computing device may determine, based on the one or more user inputs, a modified version of the cloud infrastructure topology. This modified version of the cloud infrastructure topology might comprise, for instance, new elements (e.g., new services, databases, servers), new connections (e.g., a redundant connection between two already-connected services), changes to existing elements and/or connections, or the like.

In step 305, the computing device may generate simulation data based on the cloud infrastructure topology. This process may be performed by simulating performance of each element and/or connection of the as-modified cloud infrastructure topology. For example, the computing device may in response to the user input, generate simulation data by determining estimated resources used by each element of the modified version of the cloud infrastructure topology during simulation of the modified version of the cloud infrastructure topology. This process may be performed using the one or more model(s) received in step 301. For example, the process may involve use of one or more machine learning models (e.g., trained based on historical cloud infrastructure topology performance), one or more algorithms (e.g., an algorithm to predict connection uptime and/or downtime, an algorithm to predict the frequency of use of a particular service), one or more rulesets (e.g., a rule indicating that each gigabyte of bandwidth costs a certain amount of money), or the like.

Simulation data may comprise any subjective or objective measurement of the performance of the cloud infrastructure topology as modified in accordance with the modifications received in step 304. The simulation data may comprise objective measurements such as bandwidth, latency, costs, simplicity (e.g., number of elements/connections), downtime, uptime, or the like. Such simulation data may be determined using the one or more models received via step 301. Additionally and/or alternatively, the simulation data may comprise subjective measurements such as how likely users are to be frustrated when using a particular application, how quick an application would be perceived to operate by an average user, or the like. Such subjective measurements might be determined using one or more of the models received in step 301. For example, an algorithm may be used to evaluate user satisfaction with an application provided via an cloud infrastructure topology by evaluating factors such as latency and downtime.

The generation of the simulation data may comprise use of a trained machine learning model, such as one described above with respect to step 301 and/or FIG. 2. This may involve providing the trained machine learning model data indicating the modified version of the cloud infrastructure topology and receiving, in response, at least a portion of the simulation data. For example, the computing device may provide, to a trained machine learning model, input data indicating the modified version of the cloud infrastructure topology, and the computing device may then receive, as output from the trained machine learning model, output indicating the estimated resources used by each element of the modified version of the cloud infrastructure topology.

The generation of the simulation data may comprise emulation of various events. In addition to and/or in alternative to simply predicting behavior in a general sense (e.g., estimating costs for the addition of a new service and/or server), the computing device may be configured to emulate how various elements and/or connections might behave in response to events, such as user requests, the downtime of a particular element and/or connection, or the like. For example, the computing device may simulate a plurality of different possible events occurring in the modified version of the cloud infrastructure topology. This may include iterating through various predetermined events (e.g., a large surge of user requests, the downtime of a server, a sudden slowing of a database) and estimating how those events might affect elements and/or connections in the cloud infrastructure topology (e.g., a sudden slowdown in application performance, the unavailability of an application in a particular region). Then, the computing device may determine, for each of the plurality of different possible events, the estimated resources used by each element of the modified version of the cloud infrastructure topology. This may include predicting bandwidth utilization, latency, lag, subjective evaluations of application performance, costs, or the like. Additionally and/or alternatively, the generation of the simulation data may comprise determining the probability of certain events. For instance, the probability of such events may be determined using a Markov chain, and the probability might then be used to inform the simulation data.

In step 306, the computing device may determine, based on the simulation data, one or more recommended changes to the cloud infrastructure topology. This step may be based on the simulation data, such that the computing device might evaluate the requested modifications and provide recommendations based on those modifications. For example, the computing device may identify, based on the simulation data, one or more recommended changes to the modified version of the cloud infrastructure topology. The one or more recommended changes may be additive to and/or in replacement of the modifications requested by a user. For example, if a user requests a modification that improves bandwidth but might cause an undesirable spike in the costs of operating the cloud infrastructure topology, then the computing device may determine one or more recommended changes that achieve similar goals (e.g., by improving bandwidth elsewhere) but avoids the undesirable spike in costs. As another example, if a user requests a modification that adds a server, the computing device may recommend implementing that server via a specific cloud service provider. As yet another example, if a user requests a modification to add a connection between two databases, then the computing device may recommend a change in the data architecture of one of the two databases such that they operate using a consistent architecture.

The one or more recommended changes may comprise different recommendations based on different possible goals. For example, recommended changes might relate to goals such as optimizing speed, optimizing costs, optimizing latency, lowering downtime, or the like. In turn, different recommended changes might reflect different goals, and a user might be able to select from those recommended changes based on which goal(s) (if any) they wish to prioritize. For example, the computing device may generate a first recommended change by determining, based on the simulation data, a cost-saving change to the modified version of the cloud infrastructure topology and generate a second recommended change by determining, based on the simulation data, a speed-improving change to the modified version of the cloud infrastructure topology. Moreover, some recommendations reflecting certain goals might be automatically implemented (as will be described in greater detail below with respect to step 308), whereas others reflecting other goals might await user input. For instance, recommendations related to cybersecurity (e.g., those relating to fixing known vulnerabilities) might be automatically implemented, whereas recommendations relating to cost savings might require user approval.

The one or more recommended changes may be constrained by user-specified infrastructure constraints. Different applications, organizations, and/or users might have different requirements for the performance of a cloud infrastructure. For example, some applications might require 99.9% uptime, whereas other applications might tolerate substantially less uptime so long as costs are kept in check. In turn, the one or more recommended changes may be based on comparing the simulation data to one or more user-specified infrastructure constraints. For instance, if the simulation data indicates that a user-requested modification might cause the cloud infrastructure to behave in a manner that is not permissible given the user-specified infrastructure constraints (e.g., the modifications would make the infrastructure too unreliable, too costly, too slow, or the like), then the computing device may recommend different changes that achieve similar goals while remaining within the user-specified infrastructure constraints. As another example, while a computing device might ordinarily recommend a change that adds a new server to improve application speed, the computing device might forego providing this recommended change if the recommended change would cause costs associated with a cloud infrastructure topology to exceed a predetermined threshold.

In step 307, the computing device may determine whether any recommended changes were identified in step 306. In some instances, such as where a user requests a minimal or relatively straightforward modification, no recommended changes might be identified. If one or more recommended changes were determined as part of step 306, the method 300 may proceed to step 308. Otherwise, if no recommendations were generated, the method 300 may end.

In step 308, the computing device may output the one or more recommended changes. Output of the one or more recommended changes may comprise output of the recommended changes in a user interface (e.g., the same or a similar user interface as described with respect to step 302). For example, the computing device may cause output, in the user interface, of the one or more recommended changes to the modified version of the cloud infrastructure topology. Additionally and/or alternatively, the output may comprise automatic implementation of some or all recommended changes. For instance, some recommended changes (e.g., those relating to cybersecurity, such as those fixing critical vulnerabilities) may be automatically implemented by the computing device by sending, to a cloud service provider, instructions to remedy the vulnerability. The output may additionally and/or alternatively be in the form of a file, such as an XML file, a graphical drawing, a document file, or the like.

As indicated above, output of the one or more recommended changes may be made in a user interface. This may comprise modifying display, in a user interface, of the cloud infrastructure topology based on the user's requested modifications and/or the recommended changes. For example, the computing device may modify the display of the cloud infrastructure topology based on the one or more modifications to the cloud infrastructure topology and/or the recommended changes to the modified version of the cloud infrastructure topology. In this manner, from a user's perspective, a cloud infrastructure topology might reflect not only their input via the user interface, but additional computing device-generated recommendations based on their input.

The one or more recommended changes may be processed using, for example, transformers, machine learning models, and/or natural language processors so as to be human-friendly. Given the complexity of cloud network topologies, the recommendation(s) generated by the computing device may be far too complex to be self-explanatory. For example, server/service/application names may be referred to by arbitrary identifiers that are not self-explanatory, the nature of changes (e.g., the nature of an encryption algorithm change, the nature of a change from one cloud service provider to another) might not be clear without voluminous background, or the like. In turn, where at least one of the one or more recommended changes are output (e.g., as part of giving a user an option, in a user interface, to implement the at least one of the one or more recommended changes), it may be advantageous to provide human-readable interpretations of the one or more recommended changes. This process may be performed using natural language processing techniques. For example, a natural language processing algorithm may be configured to receive input associated with the one or more recommended changes (e.g., "Server 04123 M→L $30 30 Mbps") and output human-friendly textual content (e.g., "The system recommends changing a server with identifier 04123 from a Medium size to a Large size, which will cost $30 extra a month but will increase speed by 30 Mbps."). To perform such processing, the natural language processing algorithm may be configured with information associated with recommendations (e.g., the format of certain recommendations) and the meaning of such recommendations (e.g., a table mapping a format of recommendations to their plain-language meaning). Additionally and/or alternatively, machine learning techniques may be used. A machine learning model (e.g., as implemented using an artificial neural network as described above with respect to FIG. 2) may be trained using training data comprising associations between recommendations and corresponding human-friendly descriptions. That trained machine learning model may then be provided input comprising at least one recommendation, and the trained machine learning model may be configured to output, in response to that input, a human-friendly version of the at least one recommendation. This machine learning process may thereby advantageously be capable of generating human-friendly versions of recommendations even when the format of the recommendation is not consistent enough for a mapping table or similar translation approach. Other similar approaches may be used, such as use of a transformer module, a regular expressions-type mapping of recommendation output to predetermined human-friendly translations of such output, or the like.

The conversion of the one or more recommendations to a human-friendly output may comprise generating one or more images that visually represent the one or more recommendations. In some cases, it may be easier for a human to understand changes (e.g., the addition or removal of some element of a topology, the moving of an element of the topology from one location in the cloud network to another) from a visual perspective. To achieve this process, the computing device may use one or more image generators to create a visual representation of the one or more recommendations. Such visual output may comprise a "before" and "after" set of images showing a topology before and after a recommended change, an animation showing the change occurring with respect to a topology, or the like.

As also indicated above, as part of outputting the one or more recommended changes, at least a portion of the one or more recommended changes may be implemented. For instance, as part of or after causing output of the one or more recommended changes, the computing device may cause a cloud service provider to implement at least a portion of the one or more modifications to the one or more elements of the cloud infrastructure topology and/or at least a portion of the one or more recommended changes to the modified version of the cloud infrastructure topology. This process may involve sending instructions to implement the modifications (from the user) and/or the recommended changes (from the computing device) to a cloud service provider. For example, the computing device may transmit, to a cloud service provider, instructions configured to cause the cloud service provider to implement the one or more modifications to the cloud infrastructure topology and/or the recommended changes to the modified version of the cloud infrastructure topology. The instructions may be configured in a particular cloud provider-specific format. For example, some cloud service providers may accept particular instructions (e.g., to add/remove servers, to change the operating parameters of servers, to add/remove connections between servers) via an Application Programming Interface (API), and the computing device may transmit those instructions via the API. As another example, some cloud service providers may be configured to modify the operating parameters of certain services based on command-line interface input, and the computing device may be configured to automatically generate the command-line interface input and transmit it to the appropriate node of a cloud service provider device.

The output recommendation may comprise a recommendation to change cloud service providers. For example, the computing device may output a recommendation to implement the at least one element of the modified version of the cloud infrastructure topology on a different cloud service provider. In this manner, the computing device may be configured to recommend changes to elements (e.g., servers, services) by implementing those same elements on a different cloud service provider, which may in some instances have security/efficiency/uptime benefits.

Figure 4A:
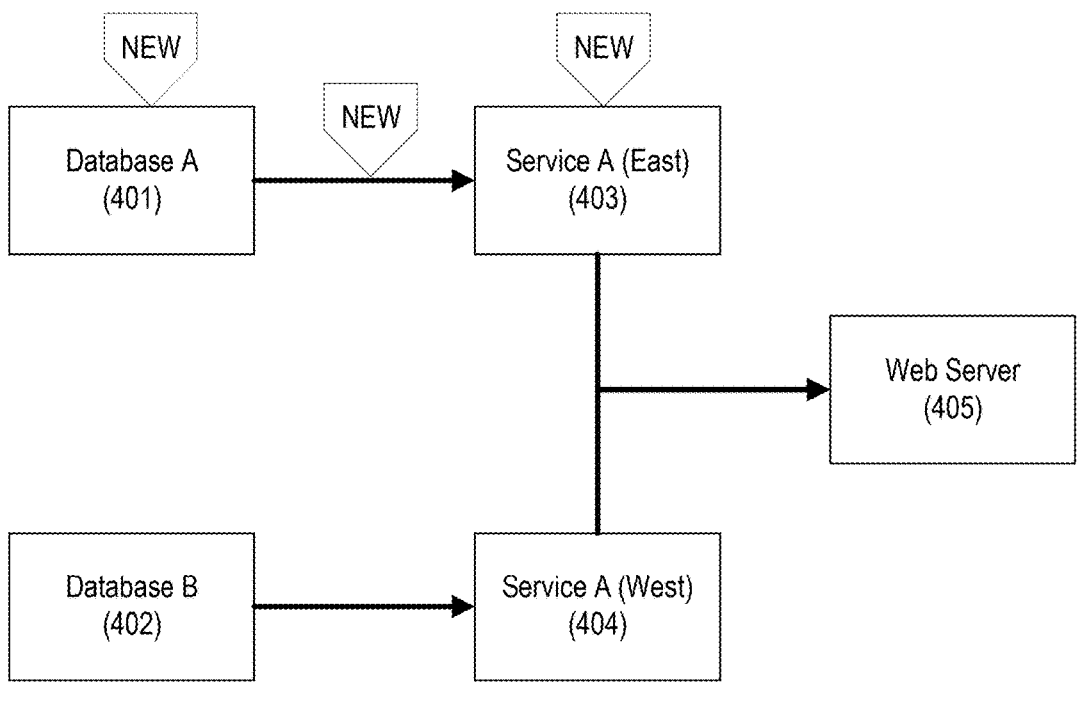
FIG. 4A depicts an illustrative cloud infrastructure topology comprising connections between databases, services, and a server.

FIG. 4A depicts an illustrative cloud infrastructure topology comprising connections between databases, services, and a server, with a particular focus on the addition of a new database and a new service in response to user input (e.g., as part of step 303 of FIG. 3). Specifically, FIG. 4A depicts a cloud infrastructure topology whereby an existing database (database B 402) and an existing service (service A (West) 404) are connected to a server (a web server 405), but that a user wishes to add a new database (database A 401) and a new service (service A (East) 403). In this example, for instance, a user might wish to, in response to user demand, effectively duplicate a database and service provided on the West Coast of the United States on the East Coast of the United States.

Figure 4B:
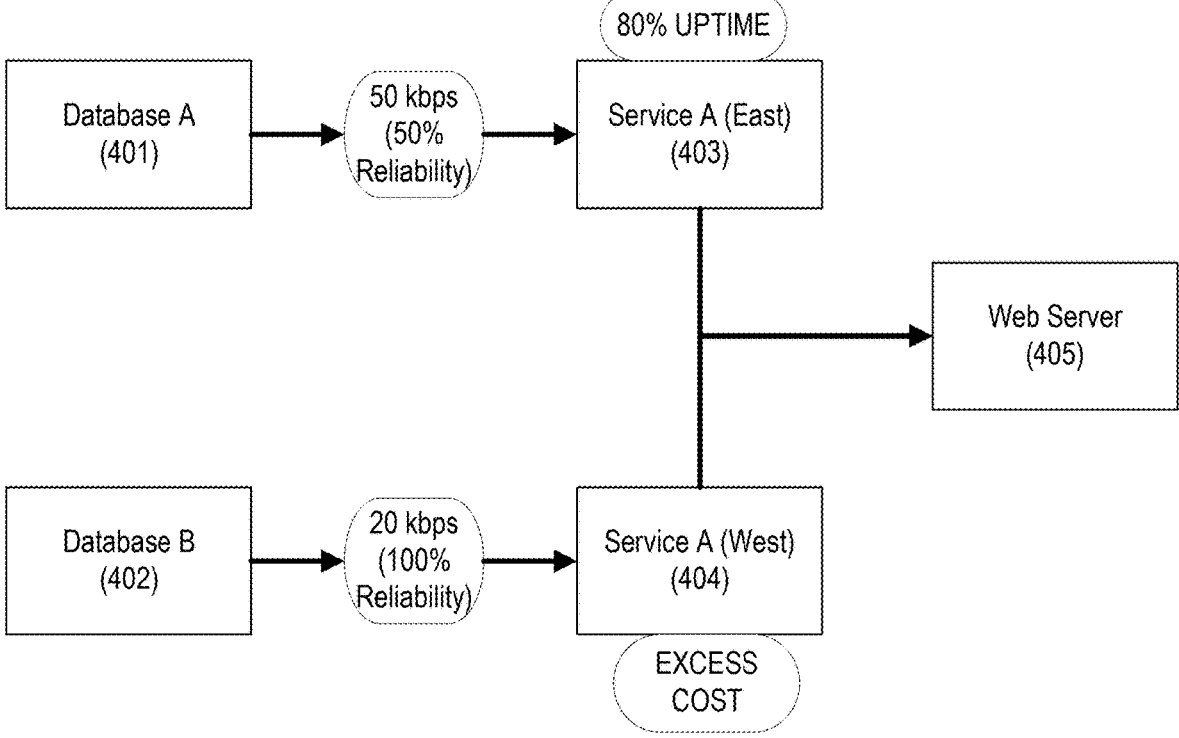
FIG. 4B depicts simulation data that might be generated based on the cloud infrastructure topology of FIG. 4A.

FIG. 4B depicts simulation data that might be generated based on the cloud infrastructure topology of FIG. 4A. In particular, FIG. 4B shows that, based on the simulation performed as part of step 305 of FIG. 3, the connection between database A 401 and the service A (East) 403 would operate at 50 kbps with 50% reliability, that the service A (East) 403 would only have an 80% uptime, and that the connection between the database B 402 and the service A (West) 404 would operate at 20 kbps with 100% reliability. FIG. 4B also indicates that the service A (West) 404 may be operating in a manner which incurs excess costs, such as being run too often, being oversized for its operations, or the like.

Figure 4C:
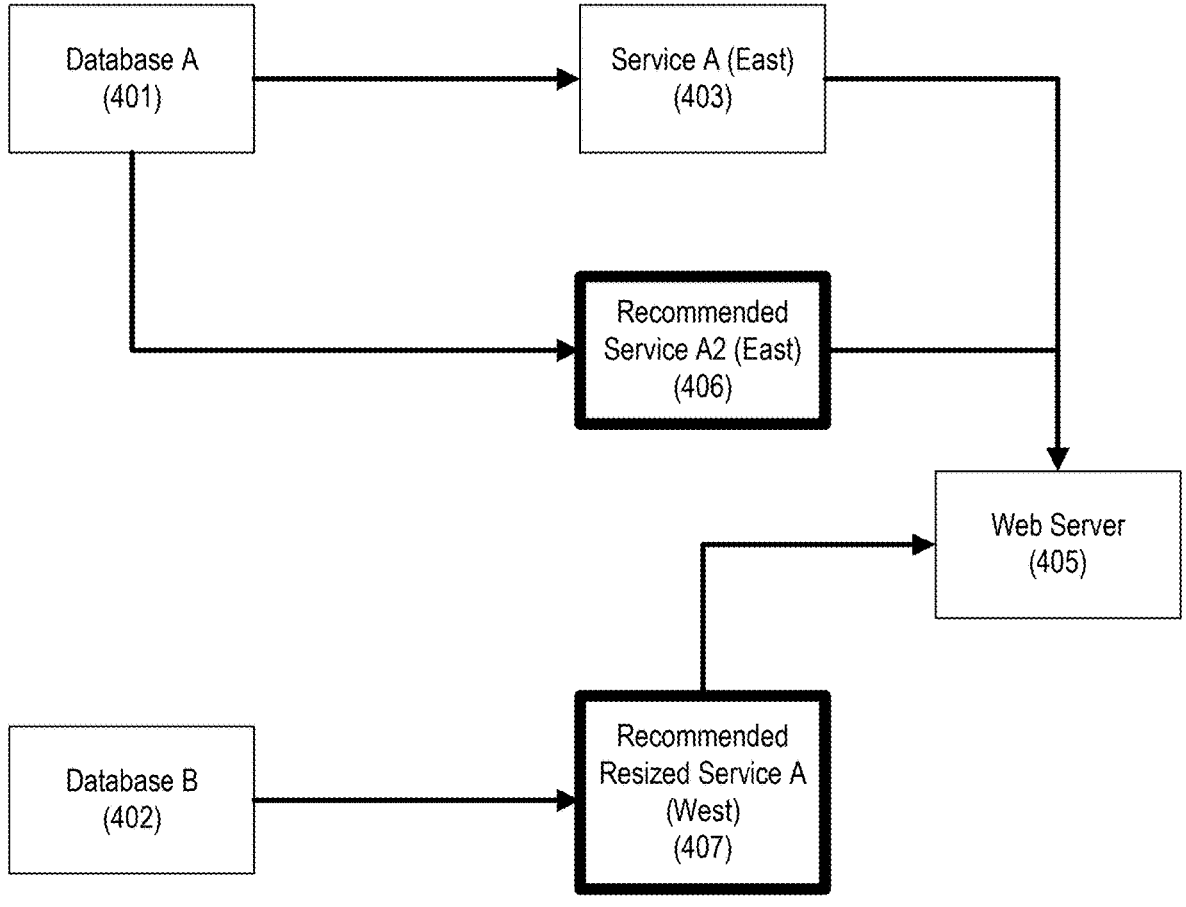
FIG. 4C depicts recommended changes to the cloud infrastructure topology of FIG. 4A.

FIG. 4C depicts recommended changes to the cloud infrastructure topology of FIG. 4A. As indicated above, the simulation data reflected by FIG. 4B indicated that the connection between the database A 401 and the service A (East) 403 would only have 50% reliability and that the service A (East) 403 would only have an 80% uptime. To remedy these issues (e.g., because the reliability is too low and/or because the uptime is too low), FIG. 4C depicts two recommendations: a recommendation to add a redundant service A in the East Coast (recommended service A2 (East) 406) and to resize the service A (West) 404 into a resized service A (West) 407. In this manner, FIG. 4C depicts how a computing device might recommend to add redundancy to lower the effects of low reliability/undesirable downtime while simultaneously making recommendations to optimize costs.

Figure 5A:
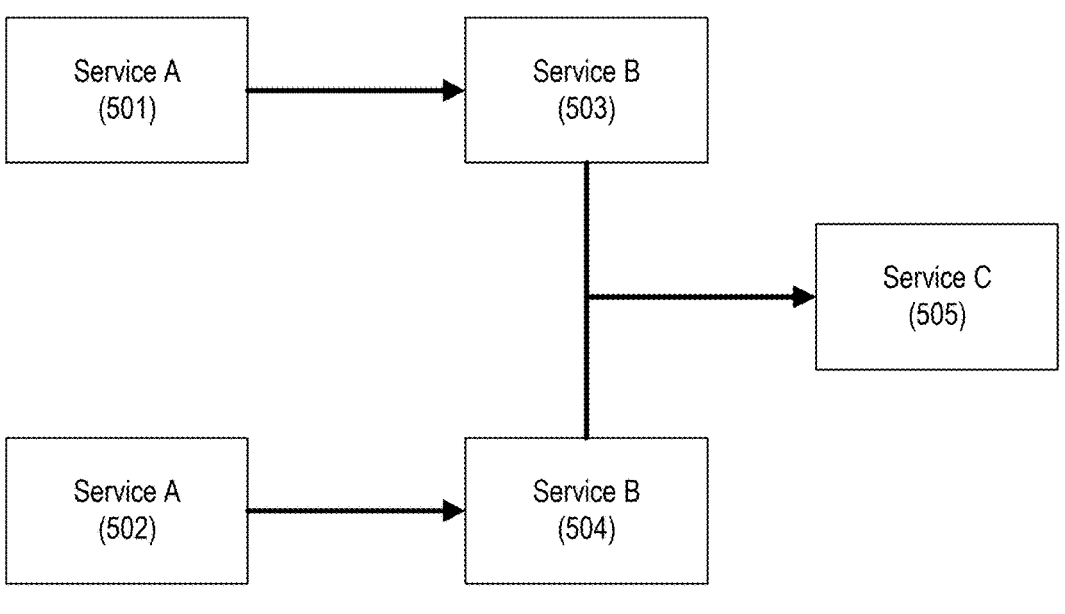
FIG. 5A depicts an illustrative cloud infrastructure topology comprising services.

FIG. 5A depicts an illustrative cloud infrastructure topology comprising services. In some cases, such as that depicted by FIG. 5A, cloud infrastructure topologies might be represented by more logical elements (e.g., services) than by physical elements (e.g., servers, databases). In particular, FIG. 5A depicts a service A 501 connected to a service B 503, a service A 502 connected to a service B 504, and both the service B 503 and the service B 504 connected to a service C 505.

Figure 5B:
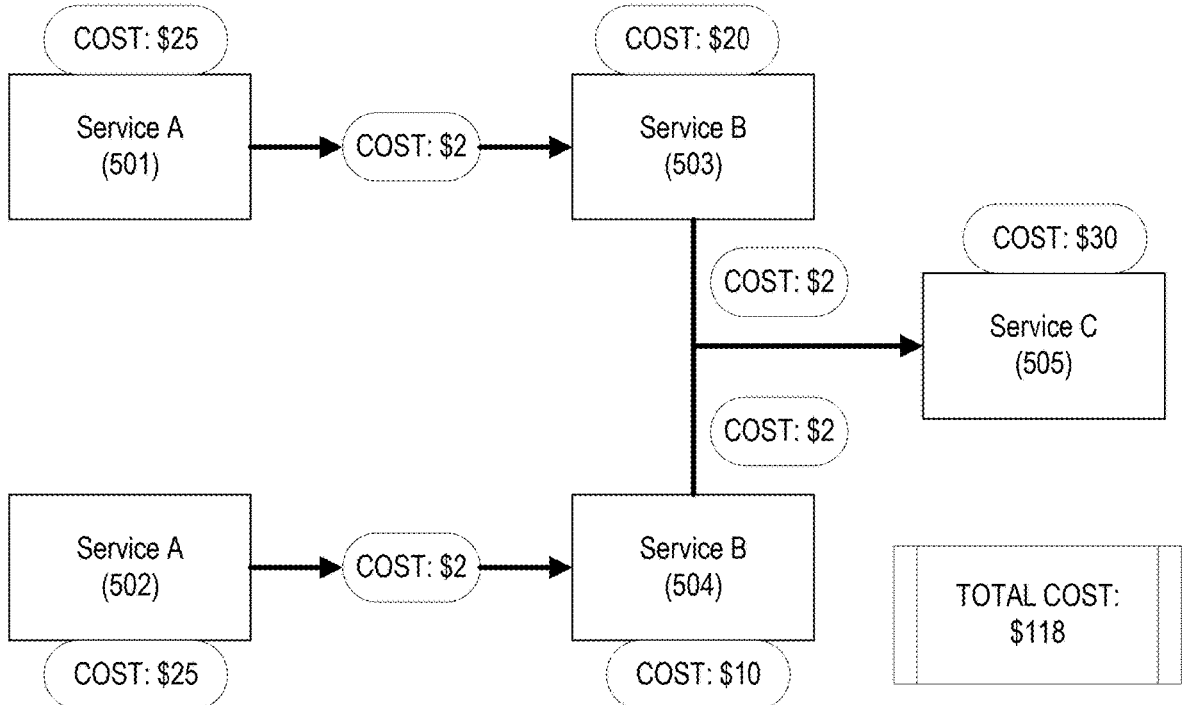
FIG. 5B depicts simulation data that might be generated based on the cloud infrastructure topology of FIG. 5A.

FIG. 5B depicts simulation data that might be generated based on the cloud infrastructure topology of FIG. 5A. In this particular case, FIG. 5B focuses on costs of the different connections and elements represented in the cloud infrastructure topology of FIG. 5A. In particular, FIG. 5B shows that the service A 501 costs $25 to operate, that the connection between the service A 501 and the service B 503 costs $2 to operate, that the service B 503 costs $20 to operate, that the service A 502 costs $25 to operate, that the connection between the service A 502 and the service B 504 costs $2 to operate, that the service B 504 costs $10 to operate, that the connections between the service B 503 and the service B 504 to the service C 505 cost $2 to operate (each), and that the service C 505 costs $30 to operate. In turn, FIG. 5B indicates that, for the cloud infrastructure topology of FIG. 5A, the simulation data might predict a total operating cost of $118, with $8 devoted to connection costs (e.g., for bandwidth) and $110 devoted to service operation costs (e.g., the cost to pay for execution of the services via a cloud service provider).

Figure 6:
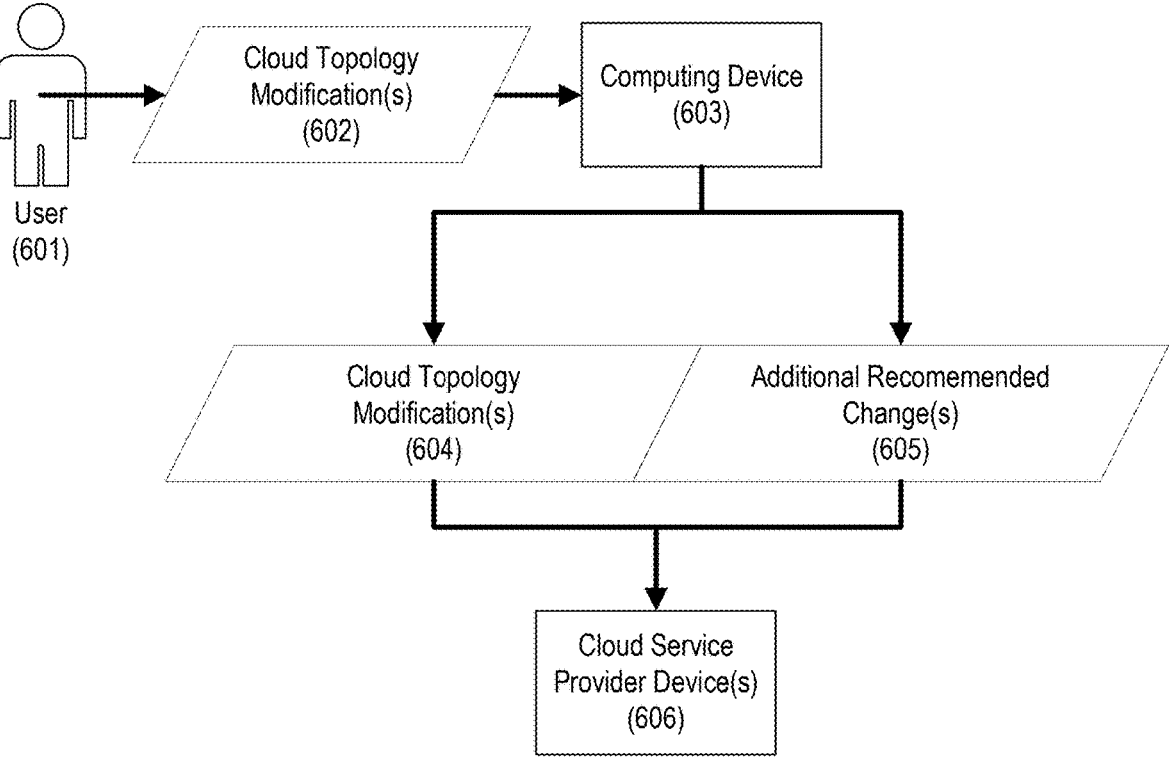
FIG. 6 depicts how cloud infrastructure topology modifications might be provided by a user and to a computing device and how those modifications might, along with additional recommendations, be adopted by a cloud service provider.

FIG. 6 depicts how cloud infrastructure topology modifications might be provided by a user and to a computing device and how those modifications might, along with additional recommendations, be adopted by a cloud service provider. Specifically, FIG. 6 depicts a process whereby a user provides input indicating one or more cloud topology modifications 602 to a computing device 603. As the computing device 603 may be the same or similar as the computing device that performs the method 300 of FIG. 3, this process may be the same or similar as, for example, step 302 and/or 303 of FIG. 3. Then, the computing device 603 may output, to one or more cloud service provider devices 606, one or more cloud topology modifications 604 in addition to one or more additional recommended changes 605. This process may be the same or similar as described with respect to step 304, step 305, step 306, step 307, and/or step 308 of FIG. 3. Note that the requested cloud topology modifications (e.g., the one or more cloud topology modifications 602) need not be the same as the output cloud topology modifications (e.g., the one or more cloud topology modifications 604). This is because the computing device may 603, based on the one or more additional recommended changes 605, only transmit a subset of the one or more cloud topology modifications 602 to the one or more cloud service provider devices 606.

Figure 7:
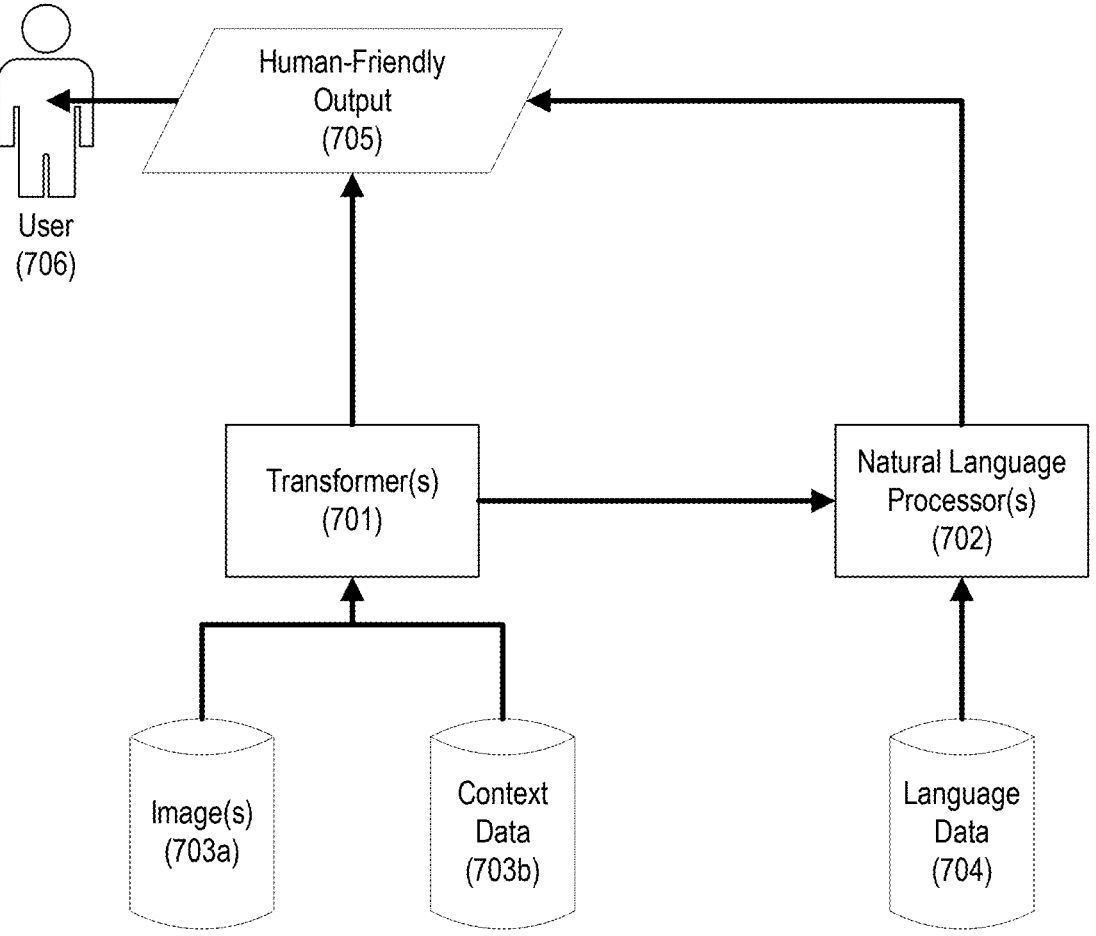
FIG. 7 depicts how output associated with cloud infrastructure topologies may be processed in a human-friendly way.

FIG. 7 depicts an illustrative process of how output associated with cloud infrastructure topologies may be processed in a human-friendly way. This process may be implemented, in whole or in part, as part of step 308 of FIG. 3, whereby a computing device might output one or more recommended changes for a cloud infrastructure topology. As shown in FIG. 7, one or more transformers 701 may have access to data such as one or more images 703a and context data 703b. The one or more transformers 701 may be, for example, machine learning models or other algorithms, and may be trained to create contextual connections between resources at a human-readable level and translate those contextual connections into visual elements to enhance the human cognition of the output recommendations. The one or more transformers 701 may be configured to generate, in whole or in part, visual representations of the one or more recommendations, such that the one or more images 703a might comprise images of servers, applications, cloud network elements, and the like, whereas the context data 703b may comprise information about the configuration of cloud network topologies, how connections between different elements of a topology should be represented (e.g., dashed lines for wireless, solid lines for wired), and the like. As also shown in FIG. 7, one or more natural language processors 702 may have access to language data 704. The one or more natural language processors 702 may be trained on a neural network (e.g., as described with respect to FIG. 2) and/or may be used in conjunction with the one or more transformers 701 to create a plain-terminology textual explanation of the visualized elements. As the one or more natural language processors 702 may be configured to provide human-friendly textual output representing recommendations, the language data 704 may comprise mappings (e.g., templates of recommendation output and corresponding human-friendly descriptions of that output), interpretive detail (e.g., information indicating that twelve-digit identifiers represent servers whereas five-digit identifiers represent applications), and the like. The output of the one or more transformers 701 and/or the one or more natural language processors 702 may be combined, in whole or in part, to create human-friendly output 705, which may be provided to a user 706 (e.g., through a user interface). One advantage of the combination depicted in FIG. 7 is that the combination can provide a simplified machine translation of the recommendation that can handle cross-language representations (e.g., English to Chinese translation), which can ensure that the abstraction of complex topology elements maintains a high degree of readability. Indeed, the structure depicted in FIG. 7 may allow for real-time user interactions with the underlying topology without compromising the integrity of representations or the necessary contextual connections between the elements required to enable the simulation functionality.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to automatically generate and simulate cloud infrastructure topologies, the computing device comprising:

one or more processors; and memory storing instructions that, when executed by the one or more processors, cause the computing device to:

provide a user interface configured to display a cloud infrastructure topology;

receive, from a user and via the user interface, one or more user inputs that comprise one or more modifications to one or more elements of the cloud infrastructure topology;

determine, based on the one or more user inputs, a modified version of the cloud infrastructure topology;

in response to the user input, generate simulation data by determining estimated resources used by each element of the modified version of the cloud infrastructure topology during simulation of the modified version of the cloud infrastructure topology;

identify, based on the simulation data, one or more recommended changes to the modified version of the cloud infrastructure topology, wherein at least one first recommended change of the one or more recommended changes relates to switching from a current cloud service provider to a different cloud service provider;

provide, as input to a first trained machine learning model, information indicating the one or more recommended changes, wherein the first trained machine learning model was trained using first training data comprising associations between topology change recommendations and human-friendly descriptions of the topology change recommendations;

receive, as output from the first trained machine learning model and in response to the input, a narrative description corresponding to the one or more recommended changes;

cause output, in the user interface, of the narrative description corresponding to the one or more recommended changes to the modified version of the cloud infrastructure topology; and based on a determination that at least one second recommended change of the one or more recommended changes relates to a security vulnerability, cause the current cloud service provider to automatically implement the second recommended change by:

generating, based on an instruction format associated with the current cloud service provider, instructions for implementing the second recommended change; and sending, to the current cloud service provider, the generated instructions.

2. The computing device of claim 1, wherein the instructions, when executed by the one or more processors, cause the computing device to determine the estimated resources used by each element of the modified version of the cloud infrastructure topology during simulation of the modified version of the cloud infrastructure topology by causing the computing device to:

provide, to a second trained machine learning model, input data indicating the modified version of the cloud infrastructure topology; and receive, as output from the second trained machine learning model, output indicating the estimated resources used by each element of the modified version of the cloud infrastructure topology.

3. The computing device of claim 2, wherein the instructions, when executed by the one or more processors, cause the computing device to:

receive, from each of a plurality of different cloud infrastructure providers, historical data corresponding to performance of a plurality of different cloud infrastructure topologies;

generate, based on the historical data, training data indicating a history of performance of each of the plurality of different cloud infrastructure topologies; and generate the second trained machine learning model by training, using the training data, a machine learning model implemented using an artificial neural network, wherein training the machine learning model comprises modifying one or more weights of the artificial neural network based on the training data.

4. The computing device of claim 1, wherein the instructions, when executed by the one or more processors, cause the computing device to determine the estimated resources used by each element of the modified version of the cloud infrastructure topology during simulation of the modified version of the cloud infrastructure topology by causing the computing device to:

simulate a plurality of different possible events occurring in the modified version of the cloud infrastructure topology; and determine, for each of the plurality of different possible events, the estimated resources used by each element of the modified version of the cloud infrastructure topology.

5. The computing device of claim 1, wherein the instructions, when executed by the one or more processors, cause the computing device to cause the output of the narrative description by causing the computing device to:

output a recommendation to implement at least one element of the modified version of the cloud infrastructure topology on the different cloud service provider.

6. The computing device of claim 1, wherein the instructions, when executed by the one or more processors, cause the computing device to cause the current cloud service provider to automatically implement the second recommended change by causing the computing device to:

transmit, via an Application Programming Interface (API) corresponding to the current cloud service provider, the generated instructions.

7. The computing device of claim 1, wherein the instructions, when executed by the one or more processors, cause the computing device to identify one or more recommended changes to the modified version of the cloud infrastructure topology by causing the computing device to:

generate a first recommended change by determining, based on the simulation data, a cost-saving change to the modified version of the cloud infrastructure topology; and generate a second recommended change by determining, based on the simulation data, a speed-improving change to the modified version of the cloud infrastructure topology.

8. The computing device of claim 1, wherein the instructions, when executed by the one or more processors, cause the computing device to:

modify the display of the cloud infrastructure topology based on:

the one or more modifications to the cloud infrastructure topology; and the recommended changes to the modified version of the cloud infrastructure topology.

9. The computing device of claim 1, wherein the instructions, when executed by the one or more processors, cause the computing device to identify the one or more recommended changes to the modified version of the cloud infrastructure topology based on comparing the simulation data to one or more user-specified infrastructure constraints.

10. The computing device of claim 1, wherein the instructions, when executed by the one or more processors, cause the computing device to receive the one or more user inputs that comprise the one or more modifications to the one or more elements of the cloud infrastructure topology by causing the computing device to:

receive an indication of a change of a first element of the cloud infrastructure topology, wherein the change indicates that the first element was relocated from a first-previous cloud service provider to the current cloud service provider.

11. A method for automatically generating and simulating cloud infrastructure topologies, the method comprising:

providing, by a computing device, a user interface configured to display a cloud infrastructure topology;

receiving, by the computing device, from a user, and via the user interface, one or more user inputs that comprise one or more modifications to one or more elements of the cloud infrastructure topology;

determining, by the computing device and based on the one or more user inputs, a modified version of the cloud infrastructure topology;

in response to the user input, generating simulation data by determining estimated resources used by each element of the modified version of the cloud infrastructure topology during simulation of the modified version of the cloud infrastructure topology;

identifying, by the computing device and based on the simulation data, one or more recommended changes to the modified version of the cloud infrastructure topology, wherein at least one first recommended change of the one or more recommended changes relates to switching from a current cloud service provider to a different cloud service provider;

providing, as input to a first trained machine learning model, information indicating the one or more recommended changes, wherein the first trained machine learning model was trained using first training data comprising associations between topology change recommendations and human-friendly descriptions of the topology change recommendations;

receiving, as output from the first trained machine learning model and in response to the input, a narrative description corresponding to the one or more recommended changes;

causing output, by the computing device and in the user interface, of the narrative description corresponding to the one or more recommended changes to the modified version of the cloud infrastructure topology; and based on a determination that at least one second recommended change of the one or more recommended changes relates to a security vulnerability, causing the current cloud service provider to automatically implement the second recommended change by:

generating, based on an instruction format associated with the current cloud service provider, instructions for implementing the second recommended change; and sending, to the current cloud service provider, the generated instructions.

12. The method of claim 11, wherein the determining the estimated resources used by each element of the modified version of the cloud infrastructure topology during simulation of the modified version of the cloud infrastructure topology comprises:

providing, to a second trained machine learning model, input data indicating the modified version of the cloud infrastructure topology; and receiving, as output from the second trained machine learning model, output indicating the estimated resources used by each element of the modified version of the cloud infrastructure topology.

13. The method of claim 12, further comprising:

receiving, from each of a plurality of different cloud infrastructure providers, historical data corresponding to performance of a plurality of different cloud infrastructure topologies;

generating, based on the historical data, training data indicating a history of performance of each of the plurality of different cloud infrastructure topologies; and generating the second trained machine learning model by training, using the training data, a machine learning model implemented using an artificial neural network, wherein training the machine learning model comprises modifying one or more weights of the artificial neural network based on the training data.

14. The method of claim 11, wherein the determining the estimated resources used by each element of the modified version of the cloud infrastructure topology during simulation of the modified version of the cloud infrastructure topology comprises:

simulating a plurality of different possible events occurring in the modified version of the cloud infrastructure topology; and determining, for each of the plurality of different possible events, the estimated resources used by each element of the modified version of the cloud infrastructure topology.

15. The method of claim 11, narrative description comprises:

outputting a recommendation to implement at least one element of the modified version of the cloud infrastructure topology on the different cloud service provider.

16. One or more non-transitory computer-readable media storing instructions configured to automatically generate and simulate cloud infrastructure topologies, wherein the instructions, when executed by one or more processors of a computing device, cause the computing device to:

provide a user interface configured to display a cloud infrastructure topology;

receive, from a user and via the user interface, one or more user inputs that comprise one or more modifications to one or more elements of the cloud infrastructure topology;

determine, based on the one or more user inputs, a modified version of the cloud infrastructure topology;

in response to the user input, generate simulation data by determining estimated resources used by each element of the modified version of the cloud infrastructure topology during simulation of the modified version of the cloud infrastructure topology;

identify, based on the simulation data, one or more recommended changes to the modified version of the cloud infrastructure topology, wherein at least one first recommended change of the one or more recommended changes relates to switching from a current cloud service provider to a different cloud service provider;

provide, as input to a first trained machine learning model, information indicating the one or more recommended changes, wherein the first trained machine learning model was trained using first training data comprising associations between topology change recommendations and human-friendly descriptions of the topology change recommendations;

receive, as output from the first trained machine learning model and in response to the input, a narrative description corresponding to the one or more recommended changes;

cause output, in the user interface, of the narrative description corresponding to the one or more recommended changes to the modified version of the cloud infrastructure topology; and based on a determination that at least one second recommended change of the one or more recommended changes relates to a security vulnerability, cause the current cloud service provider to automatically implement the second recommended change by:

generating, based on an instruction format associated with the current cloud service provider, instructions for implementing the second recommended change; and sending, to the current cloud service provider, the generated instructions.

17. The one or more non-transitory computer-readable media of claim 16, wherein the instructions, when executed by the one or more processors, cause the computing device to determine the estimated resources used by each element of the modified version of the cloud infrastructure topology during simulation of the modified version of the cloud infrastructure topology by causing the computing device to:

provide, to a second trained machine learning model, input data indicating the modified version of the cloud infrastructure topology; and receive, as output from the second trained machine learning model, output indicating the estimated resources used by each element of the modified version of the cloud infrastructure topology.

18. The one or more non-transitory computer-readable media of claim 17, wherein the instructions, when executed by the one or more processors, cause the computing device to:

receive, from each of a plurality of different cloud infrastructure providers, historical data corresponding to performance of a plurality of different cloud infrastructure topologies;

generate, based on the historical data, training data indicating a history of performance of each of the plurality of different cloud infrastructure topologies; and generate the second trained machine learning model by training, using the training data, a machine learning model implemented using an artificial neural network, wherein training the machine learning model comprises modifying one or more weights of the artificial neural network based on the training data.

19. The one or more non-transitory computer-readable media of claim 16, wherein the instructions, when executed by the one or more processors, cause the computing device to determine the estimated resources used by each element of the modified version of the cloud infrastructure topology during simulation of the modified version of the cloud infrastructure topology by causing the computing device to:

simulate a plurality of different possible events occurring in the modified version of the cloud infrastructure topology; and determine, for each of the plurality of different possible events, the estimated resources used by each element of the modified version of the cloud infrastructure topology.

20. The one or more non-transitory computer-readable media of claim 16, wherein the instructions, when executed by the one or more processors, cause the computing device to cause the output of the narrative description by causing the computing device to:

output a recommendation to implement at least one element of the modified version of the cloud infrastructure topology on the different cloud service provider.

* * * * *